United States Patent [19]

Thompson

[11] Patent Number: 4,636,059
[45] Date of Patent: Jan. 13, 1987

[54] MICROFILM READER AND PRINTER

[75] Inventor: Robert W. Thompson, Pine City, Minn.

[73] Assignee: Minnesota Mining and Manufacturing Company, St. Paul, Minn.

[21] Appl. No.: 715,682

[22] Filed: Mar. 25, 1985

[51] Int. Cl.⁴ ..................... G03G 15/04; G03B 13/28
[52] U.S. Cl. ........................... 355/5; 355/45
[58] Field of Search ............... 355/3 R, 5, 45

[56] References Cited

U.S. PATENT DOCUMENTS 3,612,678 10/1971 Haslam et al. ........................ 355/5
4,165,177 8/1979 James ................................ 355/45
4,367,033 1/1983 Watanabe ............................ 355/5

Primary Examiner—Fred L. Braun
Attorney, Agent, or Firm—Donald M. Sell; James A. Smith; David W. Anderson

[57] ABSTRACT

A microfilm reader and printer alternatively projects a magnified image of microfilmed information onto a rear-projection screen for viewing or a photoreceptor belt for printing. The projection screen and the photoreceptor belt are in parallel planes for convenient delivery of the printed image and a movable mirror system ensures that the printed image will be of the same magnification as the viewed image.

10 Claims, 3 Drawing Figures

MICROFILM READER AND PRINTER

BACKGROUND OF THE INVENTION

1. Field of the Invention

The present invention relates to apparatus which allows viewing (reading) of a magnified image of a microfilmed object document and/or printing of the magnified image of the object document on a receptor surface such as plain bond copy paper.

2. Description of the Prior Art

Existing microfilm reader/printers are designed to accept a spool of microfilm containing reduced-sized reproductions of documentary information and provide a magnified image of the microfilmed document for viewing. Typically, the apparatus also includes a printing section from which may be obtained a hard copy reproduction of the magnified image. The problem with existing reader/printers is that the hard copy reproduction does not exit the machine at a location which provides for convenient comparison between the printed image and the image being viewed. This is because the arrangement of the optical system within existing reader/printers does not permit the printing section of the machine to be arranged so that the printed copy exits the machine in side-by-side relationship to the viewing screen.

SUMMARY OF THE INVENTION

The present invention increases the convenience with which a microfilm reader/printer may be operated by providing an arrangement of optical elements within the reader/printer which allows the printed reproduction of the viewed image to exit the reader/printer adjacent the viewing screen where the printed reproduction may be easily and rapidly compared to the image being viewed. Additionally, the optical elements of the reader/printer ensure that the magnification of the reproduced copy is equal to the magnification of the viewed image.

In particular, the present invention provides a microfilm reader and printer for alternately projecting an image onto a screen for viewing and projecting the same image onto a photoreceptor for printing, which microfilm reader and printer includes an object plane defined by a surface of a microfilm strip, a planar rear-projection screen disposed in a plane parallel to the object plane, and a photoreceptor surface defining a plane and disposed parallel to the object plane and the plane of the rear-projection screen. This parallel arrangement of the object plane, the rear-projection screen, and the photoreceptor surface allows the copied image to exit the machine next to the viewing screen so that a rapid and convenient comparison between the copy and the viewed image may be accomplished.

The optical arrangement within the reader/printer includes a light source having an optical axis perpendicular to the object plane for projecting light perpendicularly through the object plane defined by the microfilm strip, a first set of mirrors consisting of an even number of mirrors and at least two mirrors for folding the light projected perpendicularly through the object plane into a light path which terminates at the rear-projection screen and which has an optical axis at the screen which is perpendicular to the plane of the screen, a second set of mirrors consisting of an even number of mirrors and at least two mirrors for folding the light projected perpendicularly through the object plane into a second light path which terminates at the photoreceptor surface and which has an optical axis at the photoreceptor surface which is perpendicular to the plane of the photoreceptor surface, wherein the first light path and the second light path are equal in length so that the image projected on the rear-projection screen is identical to the image projected on the photoreceptor surface, and means for selectively directing the light projected through the object plane along either the first light path or the second light path.

An even number of mirrors is provided between either the microfilmed object and the screen or the microfilmed object and the photoreceptor so that the image projected from the microfilm is correctly oriented for reading on the rear-projection screen and the first light path between the microfilmed object and the viewing screen is identical in length to the second light path between the microfilmed object and the photoreceptor surface to ensure that the respective magnifications of the viewed image and the printed image are identical.

Light is selectively directed along the first light path to the rear-projection screen or along the second light path to the photoreceptor surface by a movable mirror which in one position reflects light to the rear-projection screen and which in another position allows light to proceed instead to the photoreceptor surface rather than the rear-projection screen. A translatable mirror is provided to adjust the lengths of the light paths to the rear-projection screen and the photoreceptor surface so that the light paths from the microfilmed object to the rear-projection screen and from the microfilmed object to the photoreceptor surface are equal in length. The translatable mirror and the movable mirror are interconnected so that these mirrors are always in the correct position relative to each other.

BRIEF DESCRIPTION OF THE DRAWINGS

The present invention will be more thoroughly described with reference to the accompanying drawings, wherein like numbers refer to like parts in the several views, and wherein.

DESCRIPTION OF THE PREFERRED EMBODIMENT

Figure 1:
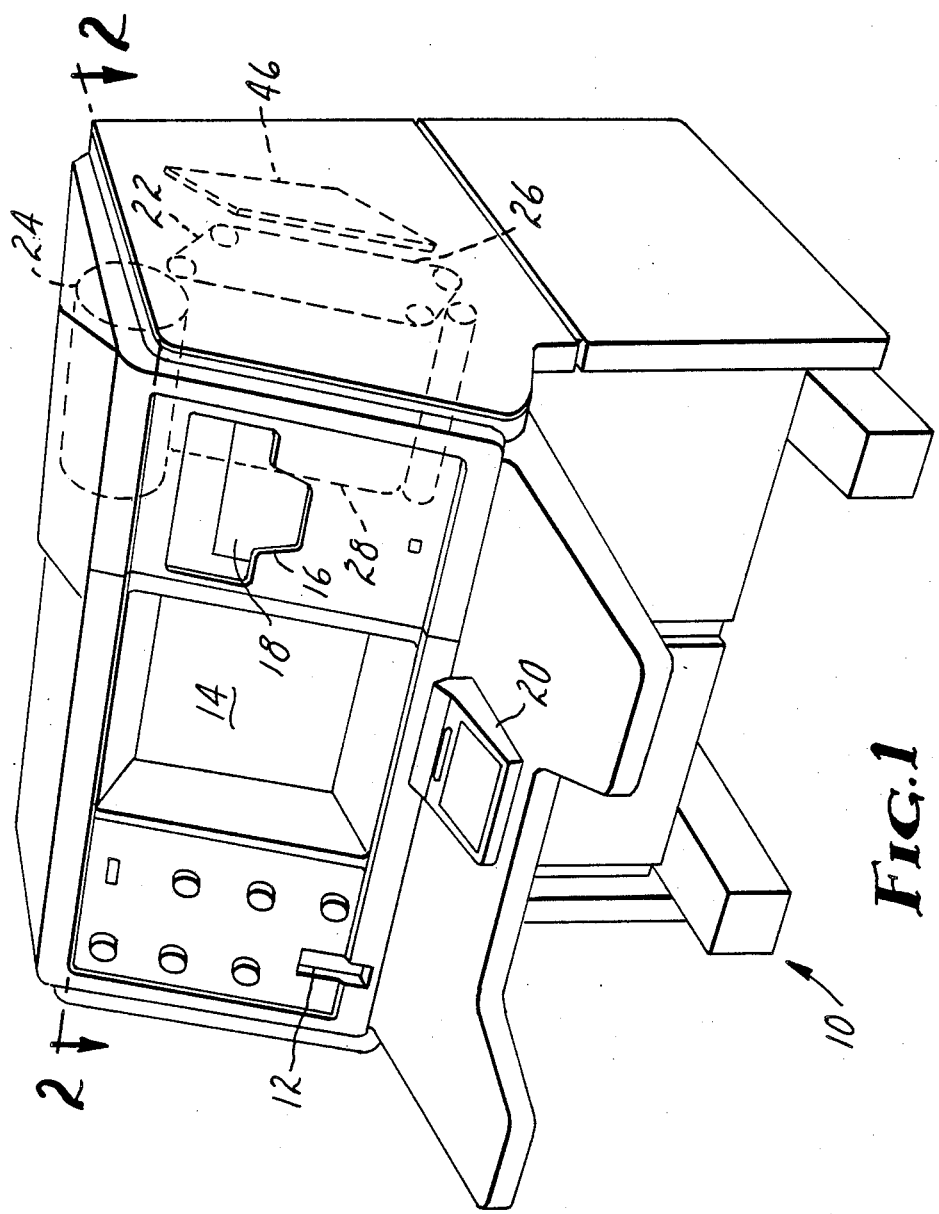
FIG. 1 is a perspective view of a microfilm reader/printer according to the present invention.

FIG. 1 illustrates a microfilm reader and printer (reader/printer), generally indicated as 10, which includes a microfilm spool loading slot 12, a viewing screen 14 and a receiving tray for hard copy, electrophotographically-printed reproductions (prints) 18 of microfilmed documents.

As will be explained more fully below, the reader/printer 10 is adapted to receive a spool of microfilm (not shown) which includes a series of miniaturized images of documentary information. The microfilmed information is accessed by means of a control panel 20 and may be alternatively projected onto the viewing screen 14 or reproduced into a print 18 by the reader/printer 10. The reader/printer 10 includes internal optics which provide a magnified image of the microfilmed information and convey this magnified image along appropriate paths within the reader/printer 10 for either viewing or printing.

The optical arrangement within the reader/printer 10 is such that the print 18 exits the reader/printer 10 into the receiving tray 16 at a location which allows the rapid and convenient comparison of the print 18 to the image projected onto the viewing screen 14. Thus an operator of the reader/printer 10 receives instant confirmation that the desired information has been reproduced from the microfilmed information.

The printing section of the reader/printer 10 is schematically illustrated in FIG. 1 and is comprised primarily of a photoreceptor belt 22 and a fuser roll 24. The photoreceptor belt 22 and the fuser roll 24 form a portion of a well-known and conventional xerographic or electrophotographic printing system and do not form a part of the present invention, except in that the orientation of the photoreceptor belt 22 relative to the internal optical elements of the reader/printer 10 allows exit of prints 18 into the conveniently positioned receiving tray 16. In operation, the rear surface 26 of the photoreceptor belt 22 is imagewise exposed and the belt 22 is rotated to bring the image to the front surface 28 of the belt 22 where the image is contacted by and transferred to a sheet of plain bond paper 18. Continued rotation of the photoreceptor belt 22 causes the paper 18 to wrap around the fuser roll 24 and be deposited in the receiving tray 16.

An electrophotographic printing process using a photoreceptor belt 22 is preferred because the belt 22 presents sufficient surface area to allow the entire image to be transferred to the belt 22 simultaneously. It is contemplated, however, that the photoreceptor belt 22 could be replaced by a rotating photosensitive drum or a moving carriage as are well known in the electrophotographic arts. It is also preferred that the prints 18 be produced by electrophotographic processses for aesthetic reasons, but dry silver or zinc oxide processes may be utilized.

Figure 2:
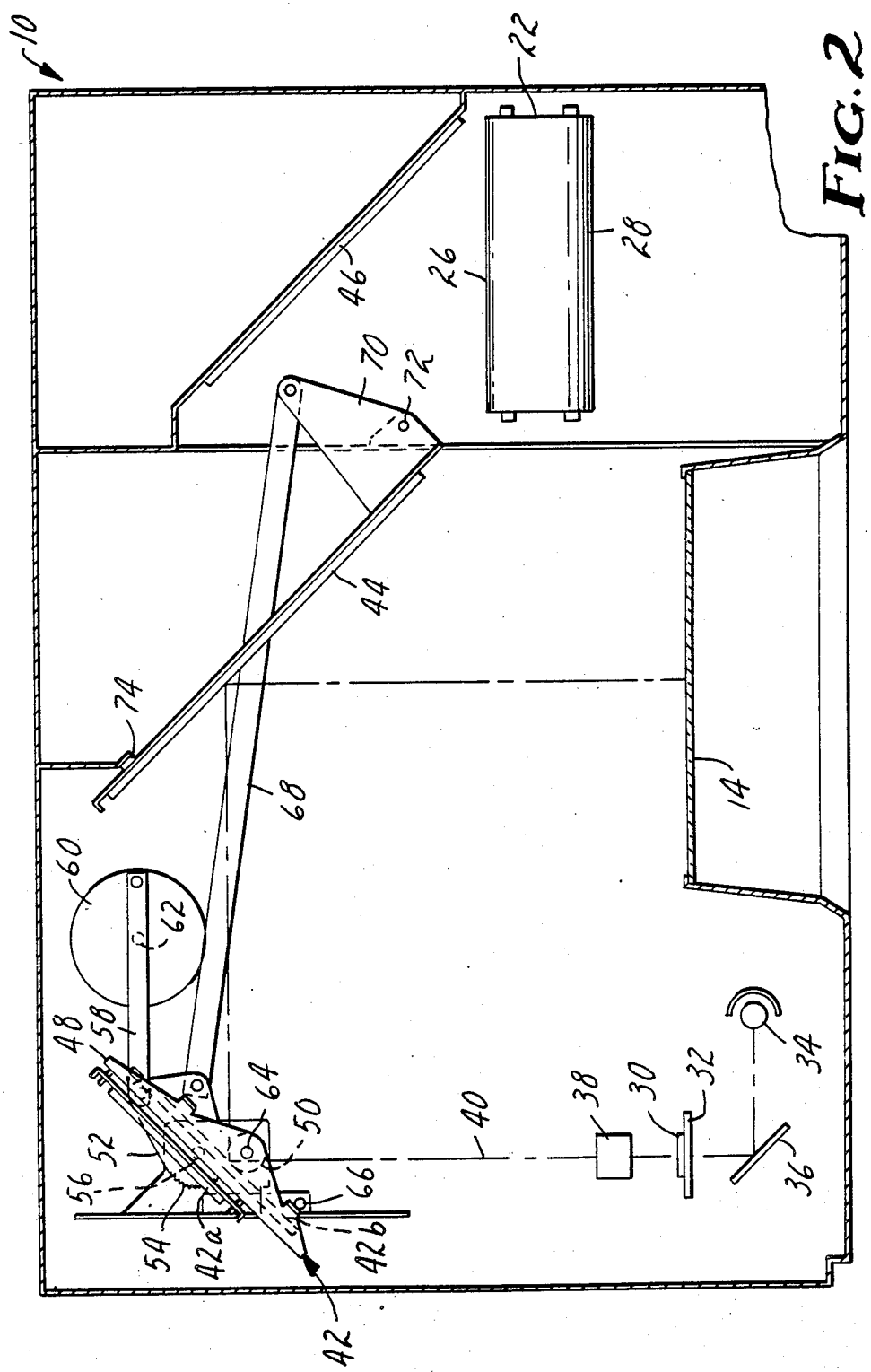
FIG. 2 a cross-sectional plan view of the microfilm reader/printer of FIG. 1, taken generally along the line 2—2 of FIG. 1, and illustrating internal optical elements in a first position.

FIG. 2 illustrates the reader/printer 10 in cross-section to reveal the internal optical arrangement. The perspective is from that of the line 2—2 of FIG. 1 and it should be recognized that although the various elements in FIG. 2 appear to be in a vertical plane, all elements are in fact tilted back at an angle of approximately 20° to a vertical plane for operator convenience. Any angle may be selected, so long as all elements maintain the positions relative to each other that are illustrated in FIG. 2.

With reference to FIG. 2, a strip of microfilm 30 is supported by a condensing lens 32 and illuminated by a light source 34. Light from the light source 34 is reflected to the microfilm 30 by a planar mirror 36. The mirror 36 is provided to conserve space within the reader/printer 10, and may be eliminated if sufficient room exists to directly illuminate the microfilm 30. The condensing lens 32, which may be a Fresnel lens, focuses light to a projection lens 38 which is used to magnify an image as is well known. Although light entering the projection lens 38 is convergent and light exiting the lens is divergent, only the optical axis 40 of the many light rays is illustrated for convenience and simplicity.

The microfilm 30 may alternatively be supported between two optically neutral transparent glass plates and the condensing lens 32 separated from the microfilm 30, if expedient. Also, a conventional "dove prism" may be incorporated in the optical axis 40 to permit rotation of the image as is well known. Incorporation of a dove prism will result in reversal of the projected image, which may be desirable depending upon the winding convention of the microfilm spool.

The microfilm 30 is typically a transparent polymer which includes a miniaturized reproduction of a document or other information impressed on or in one of its major surfaces. This major surface containing the information will be referred to as the object plane and may be either major surface of the microfilm 30.

To view an image of the microfilmed document, light is directed perpendicularly through the object plane of the microfilm 30, through the projection lens 38, and to the viewing screen 14. Between the projection lens 38 and the viewing screen 14, the light exiting the projection lens 38 is folded along a first light path by a translatable mirror 42 and a movable mirror 44. Both the translatable mirror 42 and the movable mirror 44 are planar and are oriented with respect to the object plane at an angle of 45°.

To prevent distortion of the image projected on the viewing screen 14, and to simplify the optical system, the viewing screen 14 is planar and is contained within a plane which is parallel to the object plane. Thus although the viewing screen 14 is tilted for the convenience of the operator, the planar mirror 36, the object plane, the translatable mirror 42, and the movable mirror 44 are all tilted at a like angle so that the optical axis 40 of light projected through the microfilm 30 and striking the viewing screen 14 is contained within a single plane and is perpendicular to the object plane of the microfilm 30 and the plane of the viewing screen 14. FIG. 2 thus illustrates a first light path which extends from the light source 34, through the object plane of the microfilm 30, to the translatable mirror 42, to the movable mirror 44, and finally to the viewing screen 14. The length of this light path from the microfilm 30 to the viewing screen 14 and the focal length of the projection lens 38 will determine the amount of magnification of the image produced on the viewing screen 14 and are selected to provide an image which approximates the size of the document prior to microfilming.

The viewing screen 14 is preferably a rear-projection screen wherein the projected light is diffused so that it may be viewed by the operator. The screen 14 is preferably of the micro-optical type in which surface irregularities on the order of microns are provided on the surface of a transparent glass or polymer plate. The rear-projection screen 14 may also be a dispersion screen, in which a light diffusing layer is formed by dispersing light scattering particles in a binder; a wax screen, in which wax in the form of a sheet is used as a light diffusing layer; or a crystalline polymer screen in which a crystalline polymer material in the form of a sheet is used as a light diffusing layer. These various types of rear-projection screens are well known in the art and are described in great detail in U.S. Pat. No. 4,053,208 issued to Kato et al, relevant portion of which are incorporated herein.

In operation to view an image contained on the microfilm 30, light from the light source 34 is directed perpendicularly through the object plane of the microfilm 30, through the projection lens 38, to the translatable mirror 42, to the movable mirror 44, and perpendicularly to the viewing screen 14 where the light is diffused to render the image visible.

Figure 3:
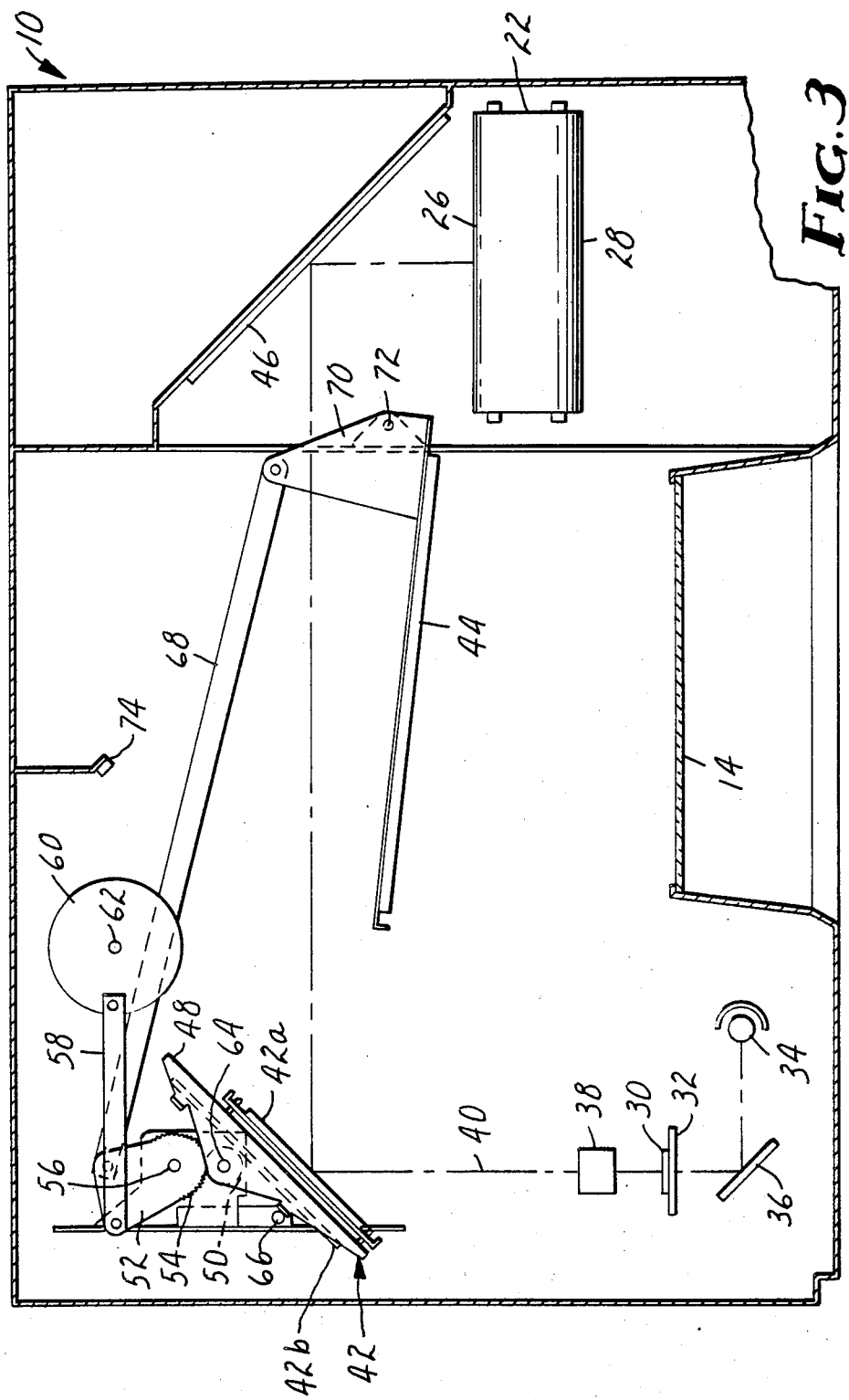
FIG. 3 is a view of the microfilm reader/printer identical to the view of FIG. 2, except that the internal optical elements are illustrated in a second position.

If and when it is desirable to form a hard copy print 18 of the image presently being viewed on the screen 14, it is necessary to change the configuration of the optical system within the reader/printer 10 so that the magnified image is projected to the rear surface 26 of the photoreceptor belt 22 rather than to the viewing screen 14. This is accomplished, as shown in FIG. 3, primarily by moving the movable mirror 44 to a forward position so that the movable mirror 44 does not intercept and reflect light to the viewing screen 14. Light will then be able to strike a fixed mirror 46 and be reflected to the photoreceptor belt 22. If only the movable mirror 44 were moved, however, the image projected onto the photoreceptor belt 22 would not be of the same magnification as the image previously projected onto the viewing screen 14. This is because the light path from the object plane of the microfilm 30 to the belt 22 via the translatable mirror 42 and the fixed mirror 46 is not the same length as the light path which previously existed from the object plane of the microfilm 30 to the viewing screen 14 via the translatable mirror 42 and the movable mirror 44. To provide a printed image which has the same magnification as a viewed image, the position of the translatable mirror 42 must be adjusted so that the length of the light path from the object plane of the microfilm 30 to the belt 22 matches the length of the light path from the object plane to the viewing screen 14. This necessary movement of the translatable mirror 42 is produced by providing two planar mirrors 42a and 42b at the position of the translatable mirror 42. These mirrors 42a and 42b are connected to and oppositely directed from a frame 48 which may be rotated when it is desired to switch from a viewing mode to a printing mode.

As illustrated in FIGS. 2 and 3, the mirror frame 48 is connected to a gear 50 which is in mesh with a plate 52 having a gear profile 54 cut in a portion of its perimeter. The gear plate 52 is pivoted around a post 56 and is connected by means of a link 58 to a disk 60 which is rotated by a motor shaft 62 attached to a drive motor (not shown). The disk 60 may simply be a lever arm extending from the motor shaft 62 to the link 58. Rotation of the disk 60, in either rotational sense, from the position shown in FIG. 2 to the position of FIG. 3 causes the gear plate 52 to rotate in a counterclockwise sense which, by means of the gear 50, causes the mirror frame 48 to rotate about its support pin 64 in a clockwise sense until the frame 48 strikes a stop bumper 66. As shown in FIG. 2, continued or opposite rotation of the disk 60 causes the frame 48 to rotate in a counterclockwise sense until this motion is likewise arrested by the stop bumper 66.

The mirrors 42a and 42b are referred to as a single translatable mirror 42 because in either of the positions illustrated in FIGS. 2 or 3, the mirrors 42a and 42b remain at an angle of 45° with respect to the object plane of the microfilm 30 and the plane of the viewing screen 14. Therefore, the net affect of rotation of the frame 48 is the translation of a planar mirror toward and away from the projection lens 38, and it should be recognized that this translation could be accomplished by providing only a single mirror in a frame and sliding the frame relative to the projection lens 38.

Upon rotation of the frame 48 to the position illustrated in FIG. 3, light is reflected to the fixed mirror 46 for further reflection to the photoreceptor belt 22. To prevent distortion of the image projected to the belt 22, the fixed mirror 46 is oriented at an angle of 45° with respect to the object plane of the microfilm 30, as was the movable mirror 44 in the viewing mode of FIG. 2. The rear surface 26 of the photoreceptor belt 22 must, therefore, also be parallel to the object plane of the microfilm 30 as is the viewing screen 14.

In order that an undistorted image be produced whether the reader/printer 10 is in either the viewing or the printing mode, it is, therefore, required that the planes of both the viewing screen 14 and the photoreceptor belt 22 be not only parallel to each other but also parallel to the object plane of the microfilm 30. To avoid a reversal of the image projected to either the viewing screen 14 or the photoreceptor belt 22, it is necessary that the number of mirrors between the microfilm 30 and either the viewing screen 14 or the photoreceptor belt 22 be of an even number. An odd number of folding mirrors would produce and undesirable reversal of the information carried on the microfilm 30. The number of mirrors between the microfilm and the imaging surface is preferably two for simplicity, but an even number of mirrors greater than two may be provided if found desirable. Finally, to ensure that the image projected onto the photoreceptor belt 22 is of the same magnification as the image projected onto the viewing screen 14, it is necessary that the light path between the microfilm 30 and either the viewing screen 14 or the photoreceptor belt 22 be of equal length. Adjustment of the length of these light paths is provided by translation of the translatable mirror 42, as previously explained.

As described earlier, in order to change the reader/printer 10 from its viewing mode of FIG. 2 to its printing mode of FIG. 3, it is necessary to remove the movable mirror 44 from the light path. Since the frame 48 must rotate when going from one mode to another, it has been found expedient to link the movable mirror 44 to the gear plate 52 so that movement of the plate 52 to rotate the frame 48 also results in the required movement of the movable mirror 44.

This is accomplished by means of a link 68 which is attached at one end to the gear plate 52 and at the other end to a linkage plate 70 attached to the movable mirror 44 and pivoted around a pin 72. It will be apparent from FIGS. 2 and 3 that movement of the link 68 will cause movement of the link 68 and rotation of the movable mirror 44 about its pin 72. A second stop bumper 74 is provided to ensure that the movable mirror 44 will assume the correct position when the reader/printer is in the viewing mode.

In operation the reader/printer 10 is initially in the viewing mode wherein light is continually directed through the microfilm 30 and the translatable mirror 42 and the movable mirror 44 are in the positions illustrated in FIG. 2. Light is then reflected to the viewing screen 14 and diffused for viewing by the operator. When the operator desires to make a print 18 of the information being displayed on the viewing screen 14, a print button on the control 20 is pressed to cause conversion of the reader/printer 10 to its print mode, which is accomplished by means of rotation of the motor disk 60 by its connected drive motor. Rotation of the disk 60 causes rotation of the gear plate 52 in a counterclockwise sense. This rotation of the gear plate 52 in turn causes translation of the translatable mirror 42 by rotation of the frame 48 and removes the movable mirror 44 from the light path by rotation of the linkage plate 70 around its pivot pin 72.

The print mode requires a short exposure flash of the light source 34, rather than continuous illumination, so the light source 34 is extinguished while the mirrors 42 and 44 are moved to the print mode position. Once the reader/printer 10 assumes the configuration shown in FIG. 3, the light source 34 flashes momentarily to imagewise expose the photoreceptor belt 22 and the printing system is activated to deliver a print 18. Upon completion of the print cycle, the disk 60 is rotated in the same or opposite direction to return the reader/printer 10 to the configuration of FIG. 2 and thus the viewing mode.

Thus, a microfilm reader/printer 10 has been described which will provide an undistorted magnified image of microfilmed information and which will provide an undistorted identically-magnified print of the image being viewed. In addition, this print will be delivered to a location of the machine which will afford a rapid and convenient comparison between the information printed and the information viewed.

Although the present invention has been described with respect to only a single embodiment, it is recognized that many modifications will be apparent to those skilled in the art. For example, although a photoreceptor belt is preferred because a belt surface may be imagewise exposed by only a single flash of an illuminating lamp, the belt may be replaced by a revolving drum if the light source is replaced by a scanning light source as is well known in the electrophotographic arts. For an undistorted image if a drum were to be used, it would be necessary that a tangent perpendicular to the diameter of the drum be contained in a plane parallel to the plane of the viewing screen 14 and the object plane of the microfilm 30. The present invention is intended to encompass all such modifications which fall within the spirit and scope of the appended claims.

I claim:

1. A microfilm reader and printer for alternately projecting an image onto a screen for reading and projecting the same image onto a photoreceptor for printing, comprising:
   an object plane defined by a surface of a microfilm strip;
   a planar rear-projection screen disposed in a plane parallel to said object plane;
   a photoreceptor surface defining a plane and disposed parallel to said object plane;
   a light source having an optical axis perpendicular to said object plane for projecting light perpendicularly through said object plane defined by said microfilm strip;
   a first set of mirrors for folding said light projected perpendicularly through said object plane into a first light path which terminates at said rear-projection screen and which has an optical axis at said screen which is perpendicular to said plane of said rear-projection screen;
   a second set of mirrors for folding said light projected perpendicularly through said object plane into a second light path which terminates at said photoreceptor surface and which has an optical axis at said photoreceptor surface which is perpendicular to said plane of said photoreceptor surface;
   wherein said first light path and said second light path are equal in length so that said image projected on said rear-projection screen is identical to said image projected on said photoreceptor surface; and
   means for selectively directing said light projected through said object plane along either said first light path or said second light path.

2. A microfilm reader and printer according to claim 1 wherein said first and second sets of mirrors consist entirely of planar mirrors and the planes of said planar mirrors, said object plane, said plane of said rear-projection screen and said plane of said photoreceptor surface are all disposed at equal angles with respect to a vertical plane so that the entire folded optical axis of said first light path and the entire folded optical axis of said second light path are disposed in a single plane which is perpendicular to said object plane and said planes of said rear-projection screen and said photoreceptor surface.

3. A microfilm reader and printer according to claim 1 wherein said first set of mirrors is two planar mirrors disposed in planes oriented perpendicular to each other and at angles of 45° with respect to said plane of said rear-projection screen and said object plane.

4. A microfilm reader and printer according to claim 3 wherein said second set of mirrors is two planar mirrors disposed in planes oriented perpendicular to each other and at angles of 45° with respect to said plane of said photoreceptor surface and said object plane.

5. A microfilm reader and printer according to claim 1 wherein said photoreceptor surface is a planar length of an endless belt having a photoreceptor surface.

6. A microfilm reader and printer according to claim 1 wherein said means for selectively directing said light includes a movable mirror which may be moved between a first position wherein said movable mirror is one of said first set of mirrors and reflects said light projected through said object plane along said first light path and to said rear-projection screen and a second position wherein said movable mirror does not intercept light projected through said object plane.

7. A microfilm reader and printer according to claim 6 wherein said means for selectively directing said light projected through said object plane includes a fixed mirror which is one of said second set of mirrors and which reflects said light projected through said object plane along said second light path and onto said photoreceptor surface.

8. A microfilm reader and printer according to claim 7 wherein said movable mirror is disposed between said fixed mirror and said object plane when said movable mirror is in said first position.

9. A microfilm reader and printer according to claim 8 wherein said means for selectively directing said light includes a translatable mirror and means for translating said translatable mirror between a first position wherein said translatable mirror is one of said first set of mirrors and reflects said light projected through said object plane along said first light path and a second position wherein said translatable mirror is one of said second set of mirrors and reflects said light projected through said object plane along said second light path, the translation of said translatable mirror being provided to adjust the lengths of said first light path and said second light path so that said first and second light paths are equal in length.

10. A microfilm reader and printer according to claim 9 wherein said means for translating said translatable mirror is a rotatable frame supporting two planar mirrors and means for rotating said frame to present one of said two planar mirrors to said light projected through said object plane.

* * * * *